April 3, 1928.
J. A. SWEENEY
OPHTHALMIC MOUNTING
Filed Dec. 3, 1923
1,664,577
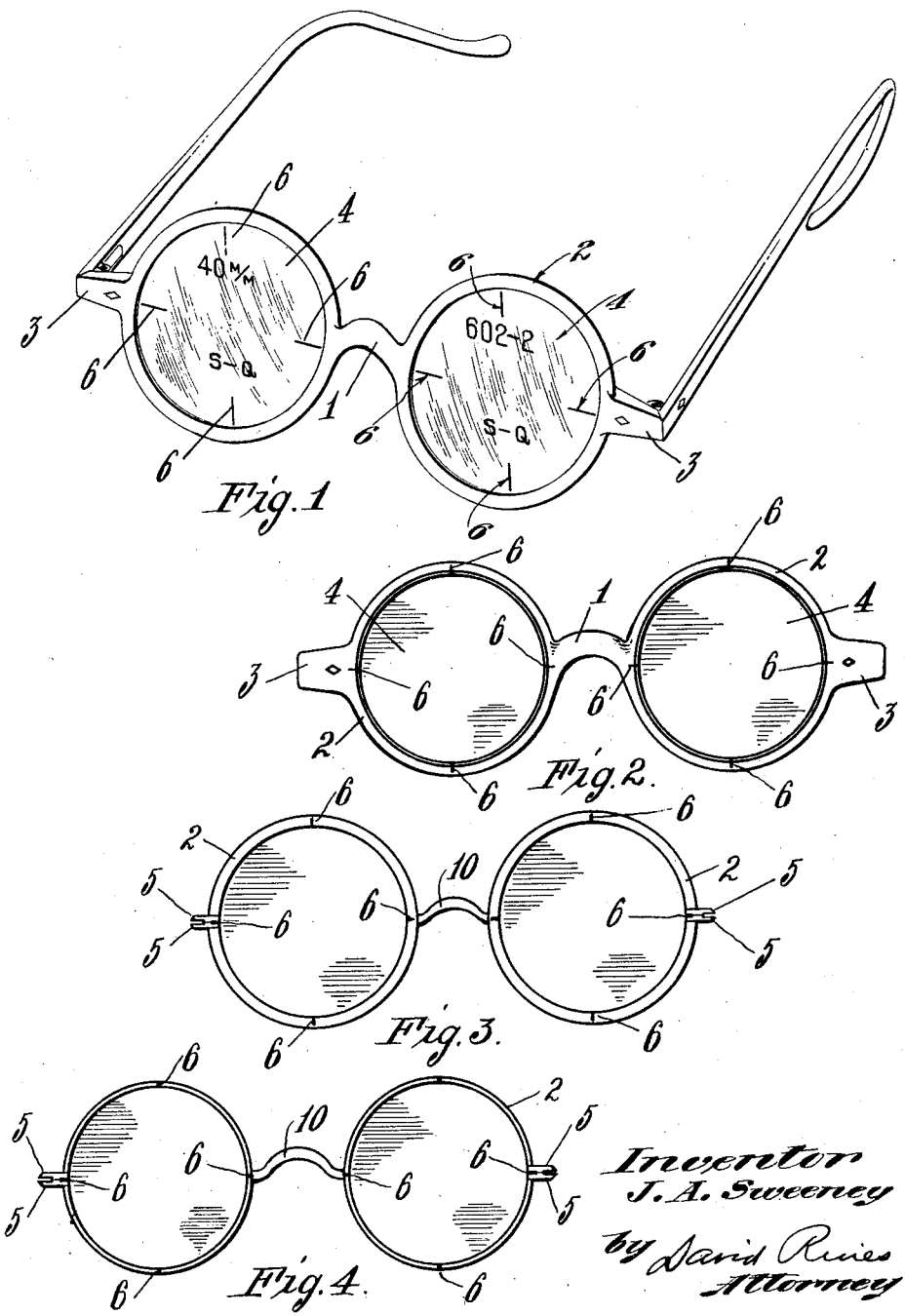

Patented Apr. 3, 1928.

1,664,577

UNITED STATES PATENT OFFICE.

JAMES A. SWEENEY, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed December 3, 1923. Serial No. 678,086.

The present invention relates to fitting devices, and more particularly to fitting frames adapted to aid the optician in fitting patients, and the object of the invention is to provide an improved fitting frame of the above-described character.

A type of ophthalmic frame that is now in very general use comprises a bridge and lens-holding rims integrally connected together and constituted of non-metallic material. Frames of this character do not readily lend themselves to adjustment, so that it becomes necessary for the optician to keep a large assortment of such mountings in stock. The only practicable way to fit frames of this character is to try one frame after another, of different sizes, until the proper size has been found. This is by no means an easy method of fitting, for it is somewhat difficult to determine, after the right-size frame has apparently been found, whether the patient's eyes are exactly central of the lens-holding rims. To overcome this difficulty, the optician has been supplied with a fitting set, consisting of a number of fitting frames of different, standard size, the lens-holding rims of which are provided with permanently inserted lenses the centers of which are etched or otherwise marked with crosses. The optician is thus enabled readily to determine whether the patient's eyes are properly centered; but the crosses are a source of great inconvenience and annoyance to the patient.

According to a feature of the present invention, the centers of the lenses are transparent, so as to permit unobstructed vision to the eyes of the patient being fitted; in fact, the lenses may be omitted altogether;
and other parts of the lenses, or parts of the frames, are provided with means for indicating the center of the lens or of the rim that is adapted to hold the lens. The optician is thus enabled readily to note whether the centers of the rims aline with the patient's eyes, and without in any way annoying the patient.

A preferred embodiment of the invention is illustrated in perspective in Fig. 1 of the accompanying drawings; and Figs. 2, 3 and 4 are views in elevation of modifications.

The fitting frame shown in Figs. 1 and 2 comprises two lens-holding rims 2 each having integral temple end pieces 3 and a bridge 1 integrally connecting the rims together at points diametrically opposed to the end pieces, the whole constituted of non-metallic material. According to the preferred embodiment of the invention that is illustrated in Fig. 1, each lens is provided along its periphery, or along the periphery of its rim 2, with radial lines 6, preferably vertically and horizontally disposed. Four of the lines 6 are therefore shown substantially in line with one another, adjacent to the bridge and to the end pieces, and the other four are shown disposed in pairs along lines at right angles to the line joining the bridge and the end pieces. The center of the lens, towards which the lines 6 point, is transparent, to provide unobstructed vision therethrough. The lens may be provided with additional characters, illustrated as 40 M/M, 602—2 and S—Q, which may indicate size, style, trade-marks and the like. The characters and the radial lines 6 may be etched, or produced in any other desired manner.

It is not essential to have lenses in the rims 2, however; and even if the lenses are used, they may break, and it may be troublesome to replace them. The radial lines 6 may therefore be provided upon the periphery of the rims themselves, as shown in Figs. 2, 3 and 4. The invention may obviously be used as well with an all-metal frame, illustrated in Fig. 4, or with a frame of the combination metal-and-celluloid type, illustrated in Fig. 3, in both of which the bridge 10 is constituted of metal, as with the frame of the type illustrated in Figs. 1 and 2, and it may be used also in connection with other types of frames, not illustrated, such as metal-bridge frames in which the rims are constituted wholly of non-metallic material. In all cases, it is preferable, though not essential, to have the lines 6 arranged vertically and horizontally when the frame is held in normal position before the eyes of the wearer; and in the case of split-rim frames, illustrated in Figs. 3 and 4, one of the horizontal lines 6 may be disposed between the end pieces 5 at the split ends of the rim.

One convenient way of providing the lines or markings upon the rims themselves is to notch the material, and then to fill the notches with whiting or other substance, whether white or colored. The markings should stand out strongly, so as not to fatigue the eye of the optician in determining whether the patient's eyes are properly centered. By having the lines 6 disposed radially at right angles to each other, as vertically and horizontally, the optician is enabled readily to determine whether the patient's eye is central of the rim.

Other modifications that are equally within the spirit of the invention will readily occur to persons skilled in the art, and all such are intended to be embraced within the scope of the appended claims.

What is claimed is:

1. A fitting frame comprising two lens-holding rims, a bridge connecting the rims, and lenses in the rims, the center of each lens being transparent to permit unobstructed vision therethrough to the eyes of the patient being fitted, there being an indicator for indicating the centers of the rims.

2. A fitting frame comprising two lens-holding rims, a bridge connecting the rims, and lenses in the rims, the centers of each lens being transparent to permit unobstructed vision therethrough to the eyes of the patient being fitted and the frame having a plurality of markings for indicating the centers of the rims.

3. A fitting frame comprising two endless lens-holding rims and a bridge integrally connecting the rims and all formed of non-metal material, the centers of the rims being optically unobstructed to permit unobstructed vision to the eyes of the patient being fitted, there being an indicator for indicating the centers of the rims.

4. A fitting frame comprising two endless lens-holding rims and a bridge integrally connecting the rims and all formed of non-metal material, the centers of the rims being optically unobstructed to permit unobstructed vision to the eyes of the patient being fitted, there being a plurality of peripheral lines for indicating the centers of the rims.

5. A fitting frame comprising two lens-holding rims, a bridge connecting the rims, and lenses in the rims, the center of each lens being transparent to permit unobstructed vision therethrough to the eyes of the patient being fitted, and each lens being provided with an indicator for indicating the center of the corresponding lens.

6. A fitting frame comprising two lens-holding rims, a bridge connecting the rims, and lenses in the rims, the center of each lens being transparent to permit unobstructed vision therethrough to the eyes of the patient being fitted, and each lens being provided along its periphery with a plurality of radial lines for indicating the center of the corresponding lens.

7. A fitting frame comprising two lens-holding rims, a bridge connecting the rims, and lenses in the rims, the center of each lens being transparent to permit unobstructed vision therethrough to the eyes of the patient being fitted, and each lens being provided along its periphery with four radial lines spaced ninety degrees apart for indicating the center of the corresponding lens.

8. A fitting frame comprising two endless lens-holding rims and a bridge connecting the rims and all formed of non-metal material, and lenses in the rims, the center of each lens being transparent to permit unobstructed vision therethrough to the eyes of the patient being fitted, and each lens being provided along its periphery with four radial lines spaced ninety degrees apart for indicating the center of the corresponding lens, the lines being substantially horizontally and vertically disposed when the frame is mounted upon the face of the patient being fitted.

9. A fitting frame comprising two rims each having an end piece and a bridge connecting the rims at points diametrically opposed to the end pieces, the rims being adapted to hold lenses, and lenses being mounted in the rims, the center of each lens being transparent to permit unobstructed vision therethrough to the eyes of the patient being fitted, there being eight peripheral markings for indicating the centers of the rims, four of the markings being substantially linearly disposed adjacent to the bridge and the end pieces, and the other four markings being disposed in pairs along lines at right angles to the line of the first-named four markings.

In testimony whereof, I have hereunto subscribed my name this 27th day of Nov., 1923.

JAMES A. SWEENEY.